United States Patent
Muthya Narahari et al.

(10) Patent No.: US 11,853,203 B1
(45) Date of Patent: Dec. 26, 2023

(54) SYSTEMS AND METHODS WITH VARIABLE SIZE SUPER BLOCKS IN ZONED NAMESPACE DEVICES

(71) Applicant: Western Digital Technologies, Inc., San Jose, CA (US)

(72) Inventors: Avinash Muthya Narahari, Bangalore (IN); Sampath Kumar Raja Murthy, Bangalore (IN); Aakar Deora, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/848,006

(22) Filed: Jun. 23, 2022

(51) Int. Cl.
*G06F 12/02* (2006.01)

(52) U.S. Cl.
CPC .. *G06F 12/0253* (2013.01); *G06F 2212/7205* (2013.01)

(58) Field of Classification Search
CPC ............... G06F 12/0253; G06F 2212/7205
USPC ......................................................... 707/813
See application file for complete search history.

(56) References Cited

U.S. PATENT DOCUMENTS

| | | | |
|---|---|---|---|
| 8,949,568 B2 | 2/2015 | Wei et al. | |
| 9,489,260 B1 | 11/2016 | Hong et al. | |
| 10,540,274 B2 | 1/2020 | Szubbocsev | |
| 10,996,867 B2* | 5/2021 | Huang | G06F 3/065 |
| 11,386,002 B2* | 7/2022 | Wu | G06F 12/0246 |
| 11,675,503 B1* | 6/2023 | Ekins | G06F 21/78 |
| | | | 711/163 |
| 11,704,021 B2* | 7/2023 | Esaka | G06F 3/061 |
| | | | 711/103 |
| 11,704,069 B2* | 7/2023 | Kanno | G06F 3/0653 |
| | | | 711/141 |
| 2020/0167274 A1* | 5/2020 | Bahirat | G06F 3/0644 |
| 2020/0393994 A1* | 12/2020 | Subbarao | G06F 3/061 |
| 2020/0394133 A1* | 12/2020 | Carpenter | G06F 3/0608 |
| 2020/0402605 A1* | 12/2020 | Subbarao | G11C 11/5635 |
| 2021/0132827 A1* | 5/2021 | Helmick | G06F 3/0629 |
| 2021/0191638 A1* | 6/2021 | Miladinovic | G11C 29/021 |
| 2021/0318820 A1 | 10/2021 | Jin et al. | |
| 2022/0300198 A1* | 9/2022 | Gao | G06F 11/3466 |
| 2022/0342544 A1* | 10/2022 | Cariello | G06F 12/0246 |
| 2023/0176780 A1* | 6/2023 | Venugopal | G06F 3/0604 |
| | | | 711/154 |
| 2023/0185471 A1* | 6/2023 | Pahwa | G06F 3/0679 |
| | | | 711/154 |

(Continued)

FOREIGN PATENT DOCUMENTS

CN           111240601 A       6/2020

OTHER PUBLICATIONS

Maheshwari, U. "From blocks to rocks: A natural extension of zoned namespaces." Proceedings of the 13th ACM Workshop on Hot Topics in Storage and File Systems. 2021 (7 pages).

*Primary Examiner* — Jorge A Casanova
(74) *Attorney, Agent, or Firm* — Michael Best & Friedrich LLP (57) ABSTRACT

During a garbage collection process of a data storage device, superblocks may be filled with dummy data, which may decrease device performance. Embodiments described herein provide systems, methods, and computer readable media for varying a size of a superblock to reduce or eliminate dummy data in a data storage device including a plurality of superblocks. Each of the plurality of superblocks including a plurality of die blocks.

16 Claims, 5 Drawing Sheets

(56) References Cited

U.S. PATENT DOCUMENTS

| | | | |
|---|---|---|---|
| 2023/0185477 A1* | 6/2023 | Sillifant | G06F 3/0604 |
| | | | 711/154 |
| 2023/0195356 A1* | 6/2023 | Luo | G06F 3/064 |
| | | | 711/154 |
| 2023/0195383 A1* | 6/2023 | Gole | G06F 3/0688 |
| | | | 711/154 |
| 2023/0195386 A1* | 6/2023 | Moon | G06F 3/0659 |
| | | | 711/154 |
| 2023/0195444 A1* | 6/2023 | Vohra | G06F 9/455 |
| | | | 717/172 |
| 2023/0197186 A1* | 6/2023 | Shetty | G11C 29/76 |
| | | | 365/185.09 |
| 2023/0205460 A1* | 6/2023 | Ishihara | G06F 3/067 |
| | | | 711/154 |
| 2023/0222058 A1* | 7/2023 | Sheridan | G06F 12/0238 |
| | | | 711/154 |

* cited by examiner

SYSTEMS AND METHODS WITH VARIABLE SIZE SUPER BLOCKS IN ZONED NAMESPACE DEVICES

FIELD OF DISCLOSURE

Embodiments described herein relate to data storage devices, and in particular, data storage devices implementing zoned namespace architecture and methods to vary a size of a superblock in the data storage devices.

SUMMARY

To increase performance, data storage devices may implement Zoned NameSpace (ZNS) architecture, in which no garbage collection (GC) process will be executed within a solid-state drive (SSD) of the data storage device if the write input/outputs (I/Os) are always sequential from a host application. In other words, the ZNS SSDs expect the host application(s) to always perform sequential writes, providing constant predictable performance.

ZNS devices are designed to handle sequential workloads but may also implement Zoned Random Write Area (ZRWA) architecture. ZRWA architecture allows a configurable size where random writes are allowed. Without ZRWA, hosts may issue writes strictly in a sequential manner, which is effectively a queue depth of 1. With ZRWA, hosts may issue multiple queue depth workloads within the ZRWA region. ZRWA also allows provisioning to overwrite the previously written data within the ZRWA region. The performance of a ZNS device implementing ZRWA architecture may be affected by a write amplification factor (WAF), which represents an amount of data written by an SSD controller of the data storage device in relation to an amount of data written by a flash controller of the host device.

To achieve better WAF, data storage location capacity is configured to achieve a maximum superblock size. To accommodate this, device firmware may try to contain the data stored within a single data storage location data to a single superblock in case of sequential writes. However, due to overwrites in ZRWA area, random data storage location data may be scattered across more than one superblock. Single data storage location data which is scattered across different superblocks needs to be gathered and written to a single superblock to keep the WAF under control. This is achieved during garbage collection for data storage location data consolidation.

In scenarios in which data storage locations do not store enough data to fill a superblock, leftover space in the superblock is written with "dummy" data to fill the superblock. Filling the superblock with dummy data has a negative effect on the overall WAF of the data storage device. Additionally, device performance is impacted while writing the dummy data.

During a GC process, a single data storage location's data may be consolidated into a single destination superblock. This consolidation is beneficial when the host device has randomly written multiple times within ZRWA such that the data spills out of the superblock. Ideally, the data storage location's data should be stored within a single superblock, but in scenarios in which data has spilled, it must be consolidated. Furthermore, a data storage location which is only partially filled may sometimes require GC. Dummy data written at the end of the superblock may be prevented by reducing the size of the superblock. The size of the superblock may be reduced just enough to accommodate all of the data from the data storage location.

Therefore, to reduce WAF in ZNS devices, it is beneficial to implement processes to reduce the size of a destination superblock during garbage collection. Embodiments described herein provide systems and methods for varying a size of a superblock in ZNS data storage devices.

In particular, embodiments described herein provide a data storage device including a memory including a plurality of superblocks, wherein each superblock is comprised of a plurality of die blocks. The data storage device also includes a controller including an electronic processor and a controller memory, the controller memory storing a set of instructions. When executed by the electronic processor, the set of instructions instruct the controller to: determine whether a garbage collection process has been initiated on a zone targeting a destination superblock of the plurality of superblocks as a destination for data, determine one or more logical block addresses associated with the data consolidated to the zone in response to determining that the garbage collection process has been initiated on the zone, determine whether the zone is full of the data based on the one or more logical block addresses that are determined, and in response to determining that the zone is not full of the data, vary a size of the destination superblock.

Other embodiments described herein provide a method for varying a size of a destination superblock of a plurality of superblocks. The method includes determining, with an electronic processor, whether a garbage collection process has been initiated on a zone targeting the destination superblock as a destination for data. The method includes determining one or more logical block addresses associated with data consolidated to the zone in response to determining that the garbage collection process has been initiated on the zone. The method includes determining whether the zone is full of the data based on the one or more logical block addresses that are determined. The method also includes in response to determining that the zone is not full of the data, varying the size of the destination superblock.

Further embodiments described herein provide a non-transitory computer-readable medium comprising a set of instructions. When executed by a controller, the set of instructions cause the controller to perform a set of operations. The set of operations includes determining whether a garbage collection process has been initiated on a zone targeting a destination superblock of a plurality of superblocks as a destination for data. The set of operations includes determining one or more logical block addresses associated with the data consolidated to the zone in response to determining that the garbage collection process has been initiated on the zone. The set of operations includes determining whether the zone is full of the data based on the one or more logical block addresses that are determined. The set of operations also includes in response to determining that the zone is not full of the data, varying a size of the destination superblock.

Other aspects of the disclosure will become apparent by consideration of the detailed description and accompanying drawings.

DETAILED DESCRIPTION

One or more embodiments and various aspects are described and illustrated in the following description and accompanying drawings. These embodiments, examples, and aspects are not limited to the specific details provided herein and may be modified or combined in various ways. Furthermore, other embodiments, examples, and aspects may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Also, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
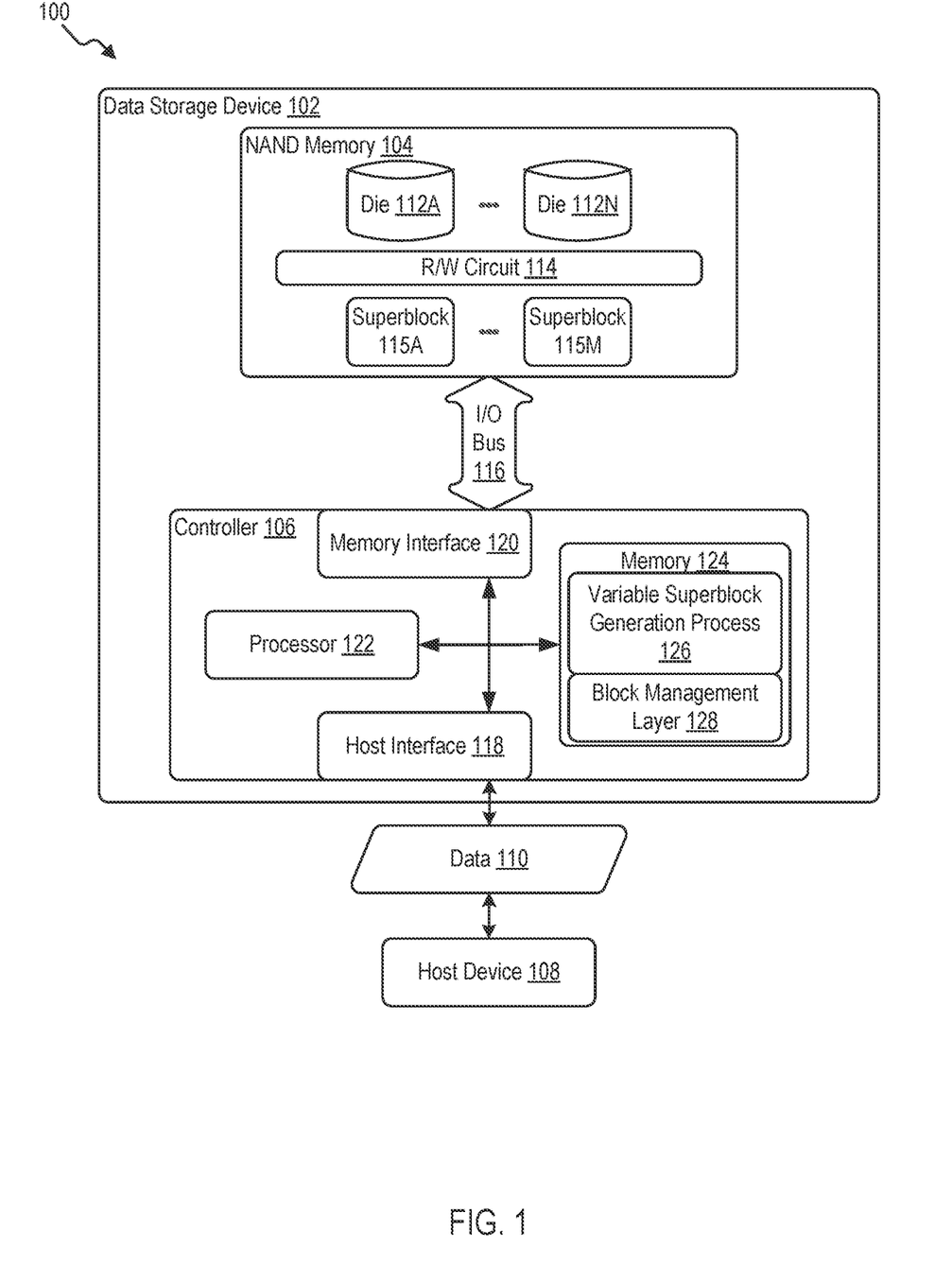
FIG. 1 is a block diagram illustrating a system including a data storage device implementing a variable superblock generation process, according to some aspects of the present disclosure.

FIG. 1 is a block diagram of a system 100 including a data storage device 102 implementing a variable superblock generation process 126. In some implementations, the data storage device 102 is a flash memory device. For example, the data storage device 102 is a Secure Digital SD® card, a microSD® card, a solid state drive (SSD), or another similar type of data storage device. The data storage device 102 illustrated in FIG. 1 includes a NAND memory 104 and a controller 106. The data storage device 102 is coupled to a host device 108 (also referred to herein as an "external electronic device"). The host device 108 is configured to provide data 110 (for example, user data) to the data storage device 102 to be stored, for example, in the NAND memory 104. The host device 108 is also configured to request data 110 to be read from the NAND memory 104. The host device 108 is, for example, a smart phone, a music player, a video player, a gaming console, an e-book reader, a personal digital assistance, a tablet, a notebook computer, a datacenter server, or other suitable device.

The NAND memory 104 illustrated in FIG. 1 includes a plurality of dies 112A-112N (for example, NAND dies) and a read/write circuit 114. The read/write circuit 114 is configured to support operation of the plurality of dies 112A-112N of the NAND memory 104. Although depicted as a single component in FIG. 1, the read/write circuit 114 may be divided into separate components of the NAND memory 104, such as a read circuit and a write circuit. The read/write circuit 114 may be external to the plurality of dies 112A-112N of the NAND memory 104. Alternatively, one or more of the plurality of dies 112A-112N of the NAND memory 104 may include corresponding read/write circuitry that is operable to read data from and/or write data to storage elements within the individual die independent of any other read and/or write operations at any of the other dies. For example, each of the plurality of dies 112A-112N may include its own internal read/write circuitry.

The NAND memory 104 further includes a plurality of superblocks 115A-115M. In some instances, the plurality of superblocks 115A-115M are stored on the plurality of dies 112A-112N. Each of the plurality of superblocks 115A-115M may correspond to a data storage location used to consolidate data during a GC process. Additionally, each of the plurality of superblocks 115A-115M may be composed of a variable number of die blocks, the number of die blocks being determined by a variable superblock generation process 126. For example, a typical superblock (described further with respect to FIG. 2) may include a default number of die blocks. A reduced superblock (described further with respect to FIGS. 3-5) may include a number of die blocks less than the default number of die blocks, as determined by the variable superblock generation process 126. The NAND memory 104 is communicable coupled to the controller 106 by an input/output ("I/O") bus 116.

The controller 106 illustrated in FIG. 1 includes a host interface 118, a memory interface 120, a processor 122 (for example, a microprocessor, a microcontroller, a field-programmable gate array (FPGA) semiconductor, an application specific integrated circuit (ASIC), or another suitable programmable device), and a memory 124 (for example, a random-access memory (RAM), a read-only memory (ROM), a non-transitory computer readable medium, or a combination thereof; the memory 124 may also be referred to as a controller memory). The controller 106 is illustrated in FIG. 1 in a simplified form. One skilled in the art would recognize that a controller for a NAND memory may include additional modules or components other than those specifically illustrated in FIG. 1. Additionally, although the data storage device 102 is illustrated in FIG. 1 as including the controller 106, in other implementations, the controller 106 is instead located within the host device 108 or is otherwise separate from the data storage device 102. As a result, operations that would normally be performed by the controller 106 (for example, wear leveling, bad block management, data scrambling, garbage collection, address mapping, or other suitable operations) can be performed by the host device 108 or another device that connects to the data storage device 102.

The controller 106 is configured to send data to, and receive data and instructions from, the host device 108 by means of the host interface 118. The host interface 118 enables the host device 108 to, for example, read from the NAND memory 104 and to write to the NAND memory 104 using any suitable communication protocol. Suitable communication protocols include, for example, the Universal Flash Storage (UFS) Host Controller Interface specification, the Secure Digital (SD) Host Controller specification, or other suitable communication protocols.

The controller 106 is also configured to send data and commands to, and receive data from, the NAND memory 104 by means of the memory interface 120. As an illustrative example, the controller 106 is configured to send data and a program command to instruct the NAND memory 104 to store data in a particular memory location in the NAND memory 104. The controller 106 is also configured to send a read-transfer command to the NAND memory 104 to read data from a particular memory location in the NAND memory 104.

The processor 122 is operatively connected to the various modules within the controller 106 and the data storage device 102. For example, firmware is loaded in a ROM of the memory 124 as computer executable instructions. Those computer executable instructions are capable of being retrieved from the memory 124 and executed by the processor 122 to control the operation of the controller 106 and perform the processes described herein. For example, the memory 124 may include a variable superblock generation process 126. The variable superblock generation process 126 is a set of instructions that, when executed by the processor 122, perform a set of operations for reducing a size of a superblock during garbage collection (GC) to reduce WAF (described with respect to FIGS. 6 and 7). The memory 124 may also include a block management layer 128 configured to control allocation of the NAND memory 104 for data stored by the data storage device 102. In some implementations, one or more modules of the controller 106 correspond to separate hardware components within the controller 106. In other implementations, one or more modules of the controller 106 correspond to software stored within the memory 124 and executed by the processor 122. The memory 124 is configured to store data used by the controller 106 during operation.

Figure 2:
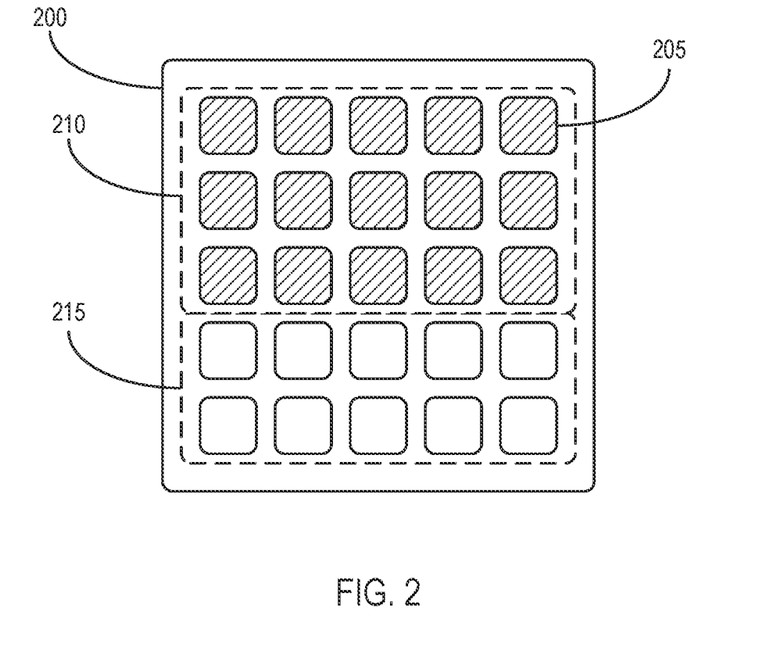
FIG. 2 is a block diagram illustrating a first example superblock within a data storage device, according to some aspects of the present disclosure.

FIG. 2 is a block diagram of a typical superblock 200 found within a data storage device (for example, one of the plurality of superblocks 115A-115M of the data storage device 102). In some instances, the typical superblock 200 is stored within the NAND memory 104. The typical superblock 200 includes a plurality of die blocks 205 configured to store data. For illustrative purposes, the plurality of die blocks 205 includes 25 die blocks. In some instances, the plurality of die blocks 205 includes more die blocks or less die blocks than the 25 die blocks pictured by FIG. 2. The die blocks 205 may be some of the dies 112A-112N of the NAND memory 104.

During a GC process performed by the data storage device 102, data may be consolidated from a plurality of data storage locations (also referred to as LBAs) within the data storage device 102 to the plurality of die blocks 205. In some instances, there may not be enough data consolidated to fill all of the plurality of die blocks 205. In these instances, a first subset of die blocks 210 is filled with the consolidated data. A second subset of die blocks 215 is a remainder of the plurality of die blocks 205 that are distinct from the first subset of die blocks 210 and is filled with dummy data to fill out the typical superblock 200. Filling the second subset of die blocks 215 with dummy data has a negative effect on the overall WAF of the data storage device 102. Additionally, performance of the data storage device 102 is impacted while writing the dummy data.

Figure 3:
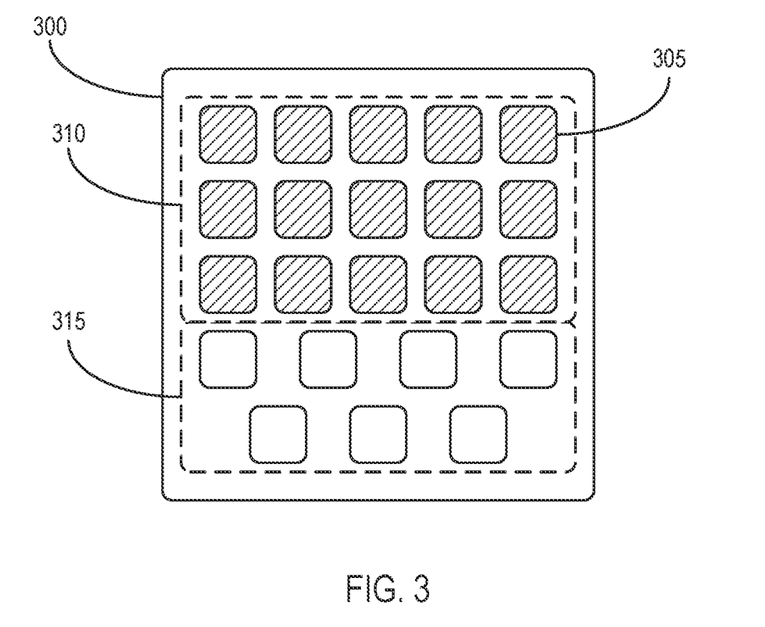
FIG. 3 is a block diagram illustrating a second example superblock that is 90% of the first example superblock of FIG. 2 from the variable superblock generation process of FIG. 1, according to some aspects of the present disclosure.

FIG. 3 is a block diagram of a reduced superblock 300 minimized to (approximately) 90% size following a variable superblock generation process. In some instances, the reduced superblock 300 is stored within the NAND memory 104 (for example, one of the plurality of superblocks 115A-115M). The reduced superblock 300 may initially include the same number of die blocks as the typical superblock 200 of FIG. 2 before the variable superblock generation process. The reduced superblock 300 includes a plurality of die blocks 305 configured to store data. For illustrative purposes, the plurality of die blocks 305 includes 22 die blocks (i.e., 90% of the 25 die blocks of the first example superblock 200 of FIG. 2). In some instances, the plurality of die blocks 305 includes more die blocks or less die blocks than pictured by FIG. 3. The die blocks 305 may be stored within one of the dies 112A-112N of the NAND memory 104.

During a GC process performed by the data storage device 102, data may be consolidated from a plurality of data storage locations (also referred to as LBAs) within the data storage device 102 to the plurality of die blocks 305. In some instances, there may not be enough data consolidated to fill each of the plurality of die blocks 305. In these instances, a first subset of die blocks 310 is filled with the consolidated data. A second subset of die blocks 315 consisting of all blocks that are not included within the first subset of die blocks 310 is filled with dummy data to fill out the reduced superblock 300. Filling the second subset of die blocks 315 with dummy data has a negative effect on the overall WAF of the data storage device 102. Additionally, performance of the data storage device 102 is impacted while writing the dummy data. However, both the negative effect on the overall WAF and reduction in performance of the data storage device 102 is reduced in comparison to the typical superblock 200 of FIG. 2.

Figure 4:
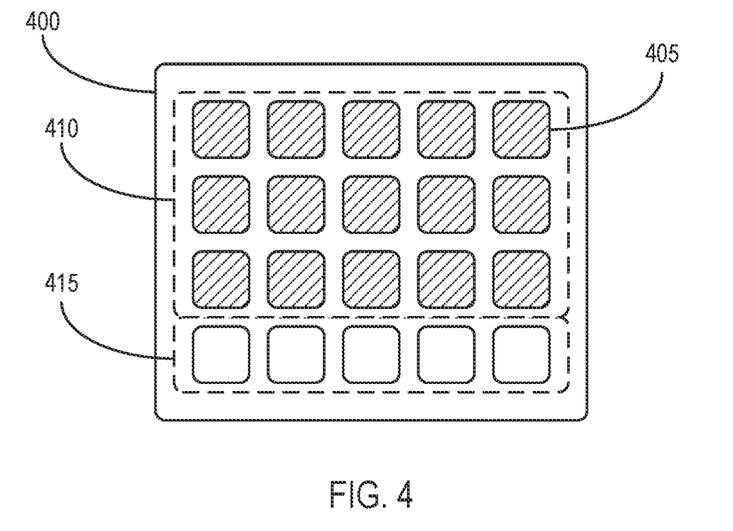
FIG. 4 is a block diagram illustrating a third example superblock that is 80% of the first example superblock of FIG. 2 from the variable superblock generation process of FIG. 1, according to some aspects of the present disclosure.

FIG. 4 is a block diagram of a reduced superblock 400 minimized to 80% size following a variable superblock generation process. In some instances, the reduced superblock 400 is stored within the NAND memory 104 (for example, one of the plurality of superblocks 115A-115M). The reduced superblock 400 may initially include the same number of die blocks as the typical superblock 200 of FIG. 2 before the variable superblock generation process. The reduced superblock 400 includes a plurality of die blocks 405 configured to store data. For illustrative purposes, the plurality of die blocks 405 includes 20 die blocks (i.e., 80% of the 25 die blocks of the typical superblock 200 of FIG. 2). In some instances, the plurality of die blocks 405 includes more die blocks or less die blocks than pictured by FIG. 4. The die blocks 405 may be stored within one of the dies 112A-112N of the NAND memory 104.

During a GC process performed by the data storage device 102, data may be consolidated from a plurality of data storage locations (also referred to as LBAs) within the data storage device 102 to the plurality of die blocks 405. In some instances, there may not be enough data consolidated to fill each of the plurality of die blocks 405. In these instances, a first subset of die blocks 410 is filled with the consolidated data. A second subset of die blocks 415 consisting of all blocks that are not included within the first subset of die blocks 410 is filled with dummy data to fill out the reduced superblock 400. Filling the second subset of die blocks 415 with dummy data has a negative effect on the overall WAF of the data storage device 102. Additionally, performance of the data storage device 102 is impacted while writing the dummy data. However, both the negative effect on the overall WAF and reduction in performance of the data storage device 102 is reduced in comparison to the typical superblock 200 of FIG. 2 or the reduced superblock 300 of FIG. 3.

Figure 5:
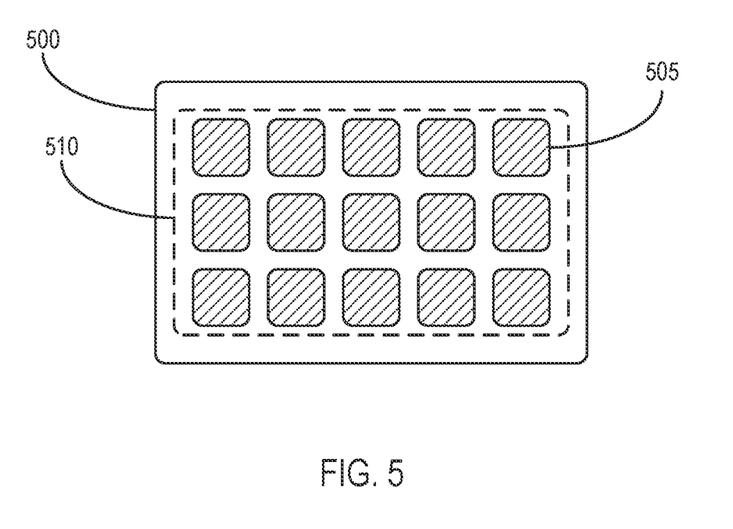
FIG. 5 is a block diagram illustrating a superblock minimized to 60% of the first example superblock of FIG. 2 from the variable superblock generation process of FIG. 1, according to some aspects of the present disclosure.

FIG. 5 is a block diagram of a reduced superblock 500 minimized to 60% size following a variable superblock generation process. In some instances, the reduced superblock 500 is stored within the NAND memory 104 (for example, one of the plurality of superblocks 115A-115M). The reduced superblock 500 may initially include the same number of die blocks as the typical superblock 200 of FIG. 2 before the variable superblock generation process. The reduced superblock 500 includes a plurality of die blocks 505 configured to store data. For illustrative purposes, the plurality of die blocks 505 includes 15 die blocks (i.e., 60% of the 15 die blocks of the typical superblock 200 of FIG. 2). In some instances, the plurality of die blocks 505 includes more die blocks or less die blocks than pictured by FIG. 5. The die blocks 505 may be stored within one of the dies 112A-112N of the NAND memory 104.

During a GC process performed by the data storage device 102, data may be consolidated from a plurality of data storage locations (also referred to as LBAs) within the data storage device 102 to the plurality of die blocks 505. In some instances, reducing the size of the reduced superblock 500 to 60% of a default size causes the reduced superblock 500 to be entirely filled by the consolidated data. In these instances, a first subset of die blocks 510 is filled with the consolidated data, and no die blocks 505 need to be filled with dummy data. In these instances, both the negative effect on the overall WAF and reduction in performance of the data storage device 102 is minimized in comparison to the typical superblock 200 of FIG. 2, the reduced superblock 300 of FIG. 3, or the reduced superblock 400 of FIG. 4. It is important to note that in this example, exactly 60% of the plurality of die blocks 505 is filled during data consolidation. In examples in which more blocks or less blocks are filled with consolidated data, the size to which the reduced superblock 500 is reduced is a size in which each of the plurality of die blocks 505 are filled, with no blocks filled by dummy data.

Figure 6:
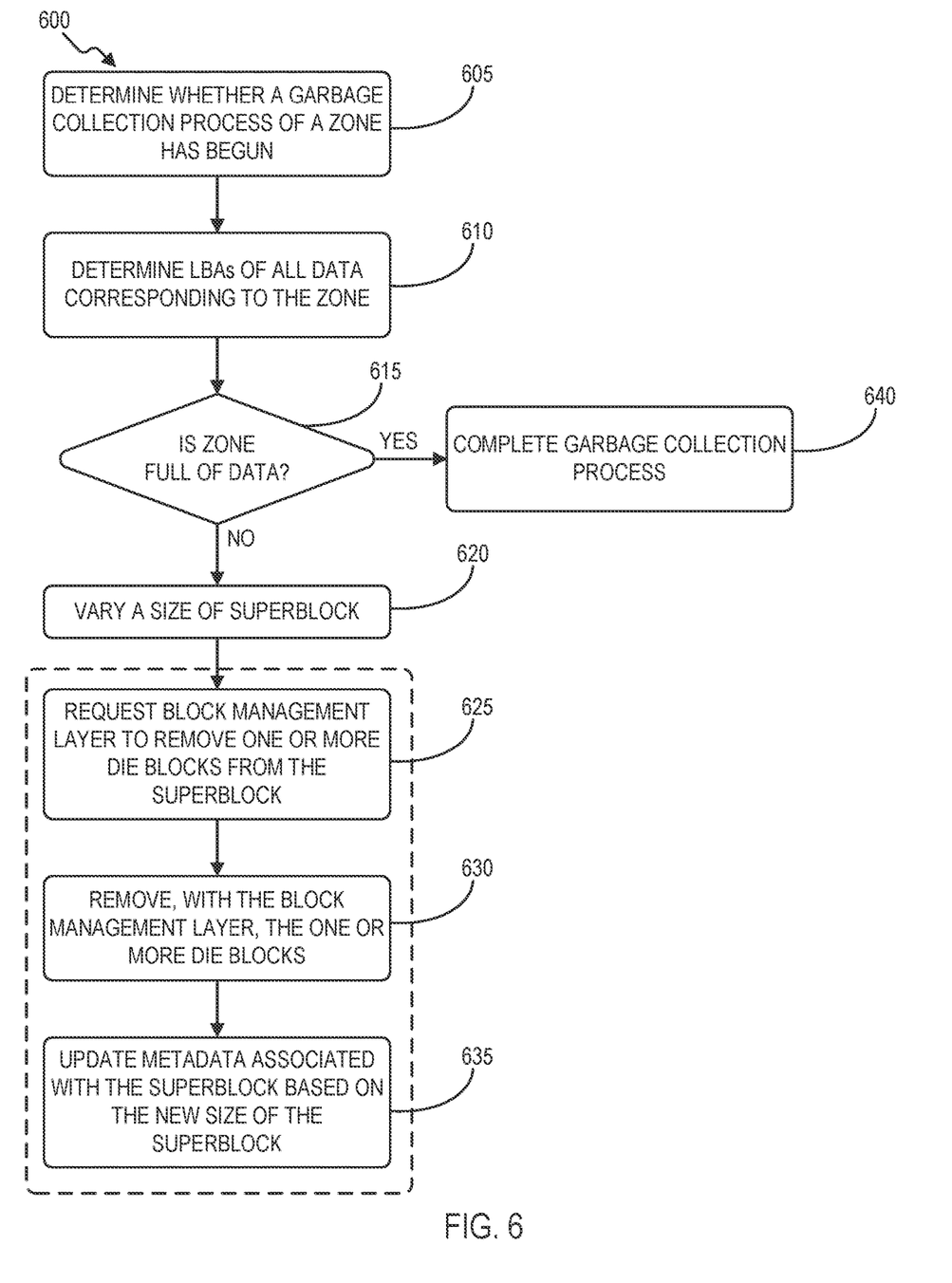
FIG. 6 is a flowchart illustrating a first example method of varying a size of a superblock within a data storage device, according to some aspects of the present disclosure.

FIG. 6 is a flowchart illustrating a first example method 600 of varying a size of a superblock within a data storage device (for example, the data storage device 102). In some instances, the method 600 may begin with a superblock of a default size (such as the first example superblock 200 of FIG. 2) and result in a superblock of a reduced size (such as the reduced superblock 300 of FIG. 3, the reduced superblock 400 of FIG. 4, or the reduced superblock 500 of FIG. 5.

The method 600 includes determining whether a GC process has begun with a zone (at block 605). For example, the processor 122 of the data storage device 102 determines whether a GC process has begun on a zone targeting a destination superblock of a plurality of superblocks as a destination for data.

The method 600 includes determining the logical block addresses (LBAs) of all data corresponding to the zone (at block 610). For example, the processor 122 may determine the LBAs of all data corresponding to the zone.

The method 600 includes determining whether the zone is full of data based on an analysis of data stored within the LBAs (at decision block 615). For example, the processor 122 determines whether the zone is full of data relative to a size of the destination superblock.

Valid data is determined looking at the logical-to-physical address map of the zone. The zone is a logically contiguous region whose data may be spread across multiple superblocks. The logical-to-physical mapping entries corresponding to the zone also will be contiguous. Each superblock contains information about which zone's data is contained within it. The processor 122 may retrieve the zone ID from each superblock and read the address mapping table for that zone. All LBA's are valid until the processor 122 hits the first mapping entry pointing to an unmapped physical location.

The method 600 also includes in response to determining that the zone is not full of data ("NO" at decision block 615), varying a size of the superblock (at block 620). For example, the processor 122 varies a size of the typical superblock 200.

To vary the size of the superblock, the method 600 includes requesting a block management layer to remove one or more die blocks from the superblock (at block 625). In some instances, the number of die blocks requested to be removed from the superblock corresponds to the amount of data in the zone (e.g., when 60% of the zone is full, 40% of the die blocks are requested to be removed). For example, the processor 122 requests the block management layer 128 to remove one or more die blocks from the plurality of die block 205 from the typical superblock 200.

To vary the size of the superblock, the method 600 includes removing, with the block management layer, the one or more die blocks from the superblock (at block 630). For example, the block management layer 128 removes the one or more die blocks of the plurality of die blocks 205 from the typical superblock 200, resulting in a superblock similar to the reduced superblock 300, 400, or 500.

To vary the size of the superblock, the method 600 also includes updating a metadata field associated with the superblock based on the new size of the superblock (at block 635). For example, the processor 122 updates a metadata field associated with the reduced superblock 300, 400, or 500 based on the new size of the reduced superblock 300, 400, or 500.

Returning to decision block 615, in response to determining that the superblock is entirely full of data (i.e., "YES" at decision block 615), the method 600 also includes completing the GC process (at block 640). For example, the processor 122 completes the GC process with the reduced superblock 300, 400, or 500.

Figure 7:
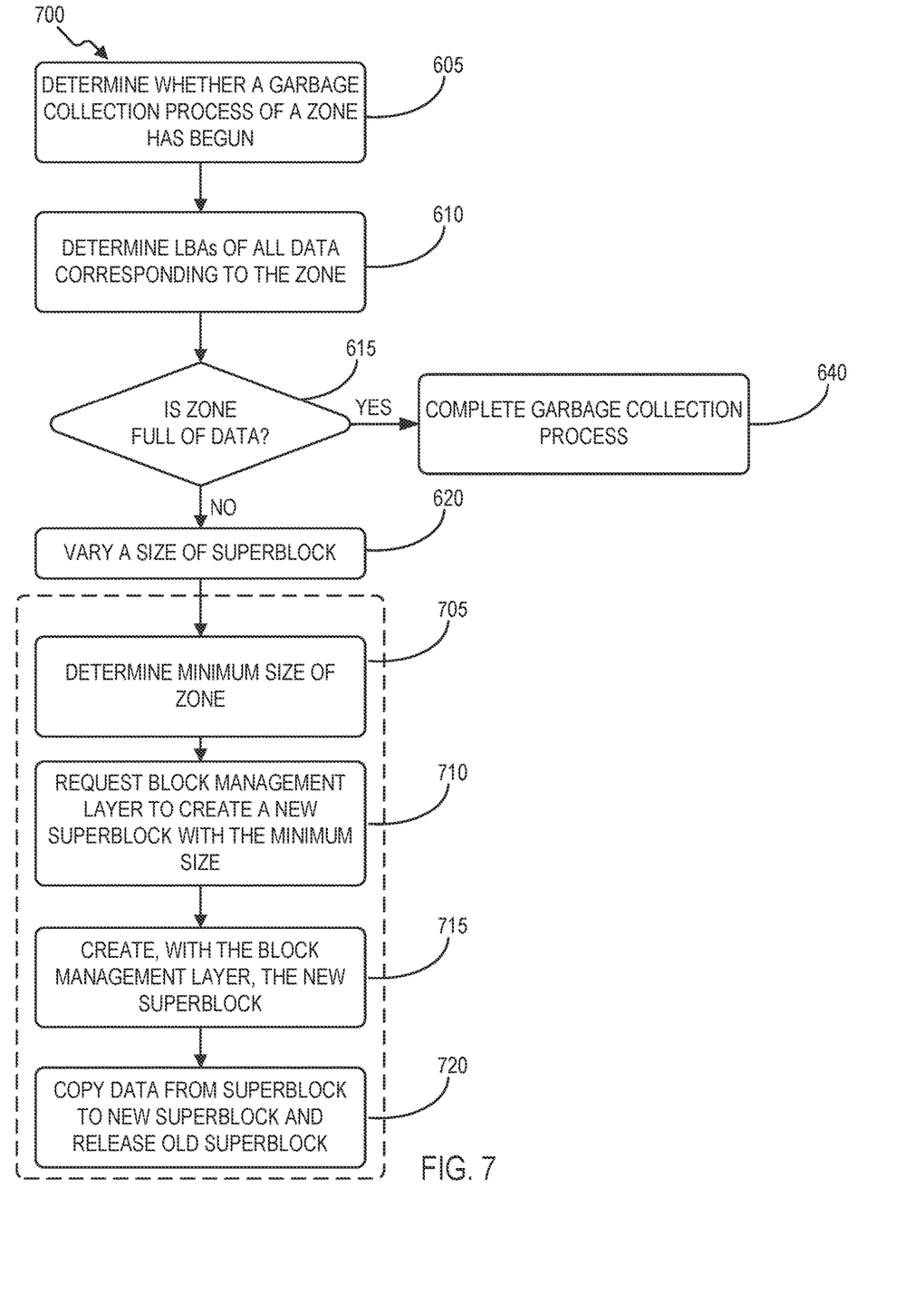
FIG. 7 is a flowchart illustrating a second example method of varying a size of a superblock within a data storage device, according to some aspects of the present disclosure.

FIG. 7 is a flowchart illustrating a second example method 700 of varying a size of a superblock within a data storage device (for example, the data storage device 102). In some instances, the method 700 may begin with a superblock of a default size (such as the typical superblock 200 of FIG. 2) and result in a superblock of a reduced size (such as the reduced superblock 300 of FIG. 3, the reduced superblock 400 of FIG. 4, or the reduced superblock 500 of FIG. 5).

The method 700 includes block 605, block 610, decision block 615, block 620, and block 640 of the method 600 of FIG. 6. Consequently, description of these blocks is not repeated with respect to FIG. 7.

Unlike the method 600, to vary the size of the superblock, the method 700 includes determining a minimum size necessary to fill the superblock (at block 705). The minimum size may be a size that can hold all consolidated data stored within the zone with no excess blocks (e.g., when 60% of the zone is full of data, the minimum size is 60%). In some instances, the minimum size is based on a comparison of the consolidated data and a default size of the superblock. For example, the processor 122 determines a minimum size necessary for valid data within the typical superblock 200.

To vary the size of the superblock, the method 700 includes requesting the block management layer to create a new superblock with the minimum size (at block 710). For example, the processor 122 requests the block management layer 128 to create a new reduced superblock 300, 400, or 500 with the minimum size relative to the superblock 200.

To vary the size of the superblock, the method 700 includes creating, with the block management layer, the new superblock (at block 715). In some instances, the method 700 may include receiving, with the processor, an indication that the new superblock has been created. For example, the block management layer 128 creates the new reduced superblock 300, 400, or 500.

To vary the size of the superblock, the method 700 also includes copying the consolidated data from the zone to the new superblock and releasing, with the block management layer, the superblock (at block 720). For example, the processor 122 copies the consolidated data stored within a zone to the plurality of die blocks 305, 405, or 505 of the new reduced superblock 300, 400, or 500, and releases, with the block management layer 128, the typical superblock 200 (i.e., the "old" superblock).

Various features and advantages of the embodiments and aspects described herein are set forth in the following claims.

What is claimed is:

1. A data storage device comprising:
    a memory including a plurality of superblocks, wherein each superblock is comprised of a plurality of die blocks; and
    a controller including an electronic processor and a controller memory, the controller memory storing a set of instructions that, when executed by the electronic processor, instruct the controller to:
        determine, with the electronic processor, whether a garbage collection process has been initiated on a zone targeting a destination superblock of the plurality of superblocks as a destination for data,
        determine one or more logical block addresses associated with the data consolidated to the zone in response to determining that the garbage collection process has been initiated on the zone,
        determine whether the zone is full of the data based on the one or more logical block addresses that are determined, and
        in response to determining that the zone is not full of the data, vary a size of the destination superblock,
    wherein the memory further includes a block management layer configured to control allocation of the memory, and
    wherein, to vary the size of the destination superblock, the set of instructions further instruct the controller to:
        request the block management layer to remove one or more die blocks of the destination superblock,
        remove, with the block management layer, the one or more die blocks, and
        update metadata associated with the destination superblock based on removal of the one or more die blocks.

2. The data storage device of claim 1, wherein the metadata associated with the destination superblock includes at least a metadata field indicating the size of the destination superblock.

3. The data storage device of claim 1, wherein, to vary the size of the destination superblock, the set of instructions further instruct the controller to:
    determine a minimum size of the zone,
    request the block management layer to create a new superblock based on the minimum size,
    receive an indication that the new superblock has been created,
    copy the data consolidated to the zone to the new superblock; and
    request the block management layer to release an old superblock.

4. The data storage device of claim 3, wherein, to determine the minimum size of the zone, the set of instructions further instructs the controller to:
    compare the data consolidated to the zone to a default size of the zone.

5. The data storage device of claim 1, wherein determining whether the zone is full of the data is based on an analysis of whether the data is stored within each of the one or more logical block addresses.

6. The data storage device of claim 1, wherein, in response to determining that the zone is full of the data, the set of instructions further instruct the controller to complete the garbage collection process.

7. A method for varying a size of a destination superblock of a plurality of superblocks, the method comprising:
    determining, with an electronic processor, whether a garbage collection process has been initiated on a zone targeting the destination superblock as a destination for data;
    determining one or more logical block addresses associated with data consolidated to the zone in response to determining that the garbage collection process has been initiated on the zone;
    determining whether the zone is full of the data based on the one or more logical block addresses that are determined; and
    in response to determining that the zone is not full of the data, varying the size of the destination superblock,
    wherein, varying the size of the destination superblock includes:
        requesting a block management layer to remove one or more die blocks of a plurality of die blocks associated with the destination superblock;
        removing, with the block management layer, the one or more die blocks; and
        updating metadata associated with the destination superblock based on removal of the one or more die blocks.

8. The method of claim 7, wherein the metadata associated with the destination superblock includes at least a metadata field indicating the size of the destination superblock.

9. The method of claim 7, wherein, varying the size of the destination superblock includes:
   determining a minimum size of the zone;
   requesting a block management layer to create a new superblock based on the minimum size;
   receiving an indication that the new superblock has been created;
   copying the data consolidated to the zone to the new superblock; and
   requesting the block management layer to release an old superblock.

10. The method of claim 9, wherein, determining the minimum size of the zone includes comparing the data consolidated to the zone to a default size of the zone.

11. The method of claim 9, wherein determining whether the zone is full of the data is based on an analysis of whether the data is stored within each of the one or more logical block addresses.

12. The method of claim 9, wherein, in response to determining that the destination superblock is full of data, the method includes completing the garbage collection process.

13. A non-transitory computer-readable medium comprising a set of instructions that, when executed by a controller, cause the controller to perform a set of operations comprising:
   determining whether a garbage collection process has been initiated on a zone targeting a destination superblock of a plurality of superblocks as a destination for data;
   determining one or more logical block addresses associated with the data consolidated to the zone in response to determining that the garbage collection process has been initiated on the zone;
   determining whether the zone is full of the data based on the one or more logical block addresses that are determined; and
   in response to determining that the zone is not full of the data, varying a size of the destination superblock,
   wherein, to vary the size of the destination superblock, the set of operations includes:
      requesting a block management layer to remove one or more die blocks of a plurality of die blocks associated with the destination superblock;
      removing, with the block management layer, the one or more die blocks; and
      updating metadata associated with the destination superblock based on removal of the one or more die blocks.

14. The non-transitory computer-readable medium of claim 13, wherein the metadata associated with the destination superblock includes at least a metadata field indicating the size of the destination superblock.

15. The non-transitory computer-readable medium of claim 13, wherein, to vary the size of the destination superblock, the set of operations includes:
   determining a minimum size of the zone;
   requesting a block management layer to create a new superblock based on the minimum size;
   receiving an indication that the new superblock has been created;
   copying the data consolidated to the zone to the new superblock; and
   requesting the block management layer to release an old superblock.

16. The non-transitory computer-readable medium of claim 15, wherein determining the minimum size of the zone includes comparing the data consolidated to the zone to a default size of the zone.

* * * * *